(12) United States Patent
Strode

(10) Patent No.: US 9,659,311 B2
(45) Date of Patent: *May 23, 2017

(54) GEOGRAPHICALLY-AWARE ELECTRONIC TRAVELING ADVERTISEMENTS

(71) Applicant: Red Hat, Inc., Raleigh, NC (US)

(72) Inventor: Maureen E. Strode, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/699,040

(22) Filed: Apr. 29, 2015

(65) Prior Publication Data

US 2015/0248703 A1 Sep. 3, 2015

Related U.S. Application Data

(63) Continuation of application No. 13/149,107, filed on May 31, 2011, now Pat. No. 9,047,650.

(51) Int. Cl.
*G06Q 30/00* (2012.01)
*G06Q 30/02* (2012.01)
(Continued)

(52) U.S. Cl.
CPC ......... *G06Q 30/0266* (2013.01); *G06Q 20/00* (2013.01); *G06Q 30/0264* (2013.01); *G06Q 50/28* (2013.01)

(58) Field of Classification Search
CPC ................. G06Q 30/0264; G06Q 30/0277
(Continued)

(56) References Cited

U.S. PATENT DOCUMENTS 9,047,650 B2 * 6/2015 Strode .................... G06Q 20/00
2005/0273385 A1 12/2005 Vandervoort
(Continued)

FOREIGN PATENT DOCUMENTS

GB 2446243 A * 8/2008 ............. G09F 21/02

OTHER PUBLICATIONS

USPTO, Office Action for U.S. Appl. No. 13/149,107 mailed on Nov. 15, 2012.
(Continued)

*Primary Examiner* — James A Reagan
(74) *Attorney, Agent, or Firm* — Lowenstein Sandler LLP

(57) ABSTRACT

Implementations disclose geographically-aware electronic traveling advertisements. A method includes providing, by a mobile advertising unit, advertisements for display on an electronic display of the mobile advertising unit, wherein the advertisements are stored in a data store of the mobile advertising unit, receiving a priority advertisement and rules corresponding to the priority advertisement, wherein the rules comprise a range of locations that trigger display of the priority advertisement and a time range to trigger display of the priority advertisement, identifying a current location of the mobile advertising unit from a location unit of the mobile advertising unit and a current time, determining that at least one of the current location is within the range of locations of the rules for the priority advertisement or the current time is within the time range of the rules for the priority advertisement, and providing the priority advertisement for display on the electronic display.

20 Claims, 5 Drawing Sheets

(51) Int. Cl.
*G06Q 20/00* (2012.01)
*G06Q 50/28* (2012.01)

(58) Field of Classification Search
USPC .......................................... 705/14.63, 14.61
See application file for complete search history.

(56) References Cited

U.S. PATENT DOCUMENTS

| | | | |
|---|---|---|---|
| 2006/0026067 A1* | 2/2006 | Nicholas | G06Q 30/00 705/14.58 |
| 2007/0083428 A1* | 4/2007 | Goldstein | G01C 21/3644 705/14.53 |
| 2008/0242280 A1* | 10/2008 | Shapiro | H04N 21/25891 455/414.3 |
| 2010/0306226 A1 | 12/2010 | Mawani et al. | |

OTHER PUBLICATIONS

USPTO, Final Office Action for U.S. Appl. No. 13/149,107 mailed on Mar. 18, 2013.
USPTO, Office Action for U.S. Appl. No. 13/149,107 mailed on Sep. 8, 2014.
USPTO, Advisory Action for U.S. Appl. No. 13/149,107 mailed on May 30, 2013.
USPTO, Notice of Allowance for U.S. Appl. No. 13/149,107 mailed Feb. 2, 2015.

* cited by examiner

| Mobile Advertising Unit ID # 210 | | | | 200 |
|---|---|---|---|---|
| AD ID 220 | GPS Coordinates 230 | Time Start 240 | Time End 250 | |
| Log Entry 1 | | | | ← 260 |
| Log Entry 2 | | | | |
| Log Entry 3 | | | | |
| ... | | | | |
| Log Entry N | | | | |

400 

```
Receive advertisement logs from a plurality of mobile advertising units
                                                                      410
```

```
Correlate advertisement log data with data from client datastore to create billing
statements for one or more clients advertising on mobile advertising units, where
      billing is based on where and when client advertisements where shown
                                                                             420
```

```
Correlate advertisement log data with data from advertisement display property
    datastore to create commission statements for one or more owners of the
     property having the mobile advertising units, where commission is based on
  where and when advertisements where shown on mobile advertisements units
                                                                              430
```

```
Provide real-time impression/exposure reports via a web interface based on data
from advertisement logs to clients and property owners showing where and when
             advertisements are shown on mobile advertising units
                                                                            440
```

*Fig. 4*

GEOGRAPHICALLY-AWARE ELECTRONIC TRAVELING ADVERTISEMENTS

PRIORITY CLAIM TO RELATED APPLICATION

This application is a continuation of and claims the benefit under 35 U.S.C. §120 of U.S. patent application Ser. No. 13/149,107, filed on May 31, 2011, the entirety of which is incorporated herein by reference.

TECHNICAL FIELD

The embodiments of the disclosure relate generally to electronic advertisements and, more specifically, relate to geographically-aware electronic traveling advertisements.

BACKGROUND

Advertisers provide advertisements ("ads") in different forms in order to attract consumers. Conventional forms of ads, such as print ads and billboards, may catch the attention of a passerby or motorist for a short period of time. But, by way of comparison, ads placed on commercial vehicles, such as buses, trucks, company vans, and taxicabs, can advantageously exploit the high visibility of these vehicles. Moreover, the mobile nature of these vehicles translates into higher exposure in different areas and to surrounding vehicles.

Electronic ads offer a quick and efficient way to display multiple ads that are current and relevant. Moreover, a single electronic ad can display ads from many different vendors. Combining electronic ads with commercial vehicles brings the benefits of both forms of advertisements together. However, one problem that is not addressed when using electronic ads on commercial vehicles is the ability to understand the audience that is actually seeing the ad and controlling the ad display accordingly.

Moreover, in a time when many commercial vehicle providers, such as transit authorities, are facing tighter budgets and financial pressures, they are searching for ways to add value to the prime advertisement space on these vehicles. Currently, there is no way to specifically target and control electronic ads for places and times on commercial vehicles.

BRIEF DESCRIPTION OF THE DRAWINGS

Implementations of the disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow diagram illustrating a method performed by a central platform server for geographically-aware electronic traveling advertisements according to an embodiment of the disclosure.

DETAILED DESCRIPTION

Figure 1:
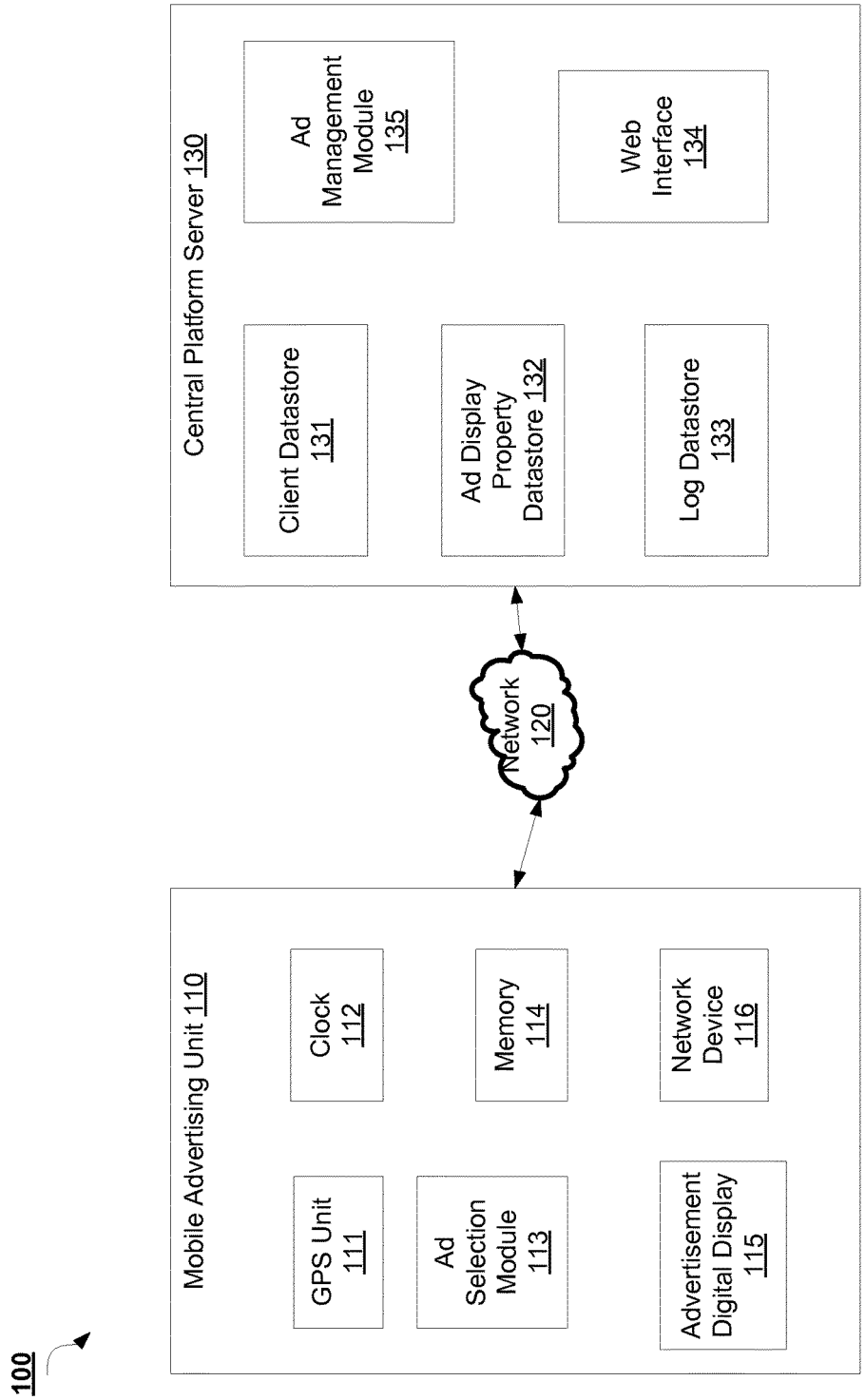
FIG. 1 is a block diagram of a system for providing geographically-aware traveling electronic advertisements ("ads") according to an embodiment of the disclosure.

Embodiments of the disclosure provide for geographically-aware electronic traveling advertisements. A method of embodiments of the disclosure includes providing, by a mobile advertising unit, advertisements for display on an electronic display of the mobile advertising unit, wherein the advertisements are stored in a data store of the mobile advertising unit, receiving a priority advertisement and rules corresponding to the priority advertisement, wherein the rules comprise a range of locations that trigger display of the priority advertisement and a time range to trigger display of the priority advertisement, identifying a current location of the mobile advertising unit from a location unit of the mobile advertising unit and a current time, determining that at least one of the current location is within the range of locations of the rules for the priority advertisement or the current time is within the time range of the rules for the priority advertisement, and providing the priority advertisement for display on the electronic display.

In the following description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "displaying", "determining", "interrupting", "recording", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the disclosure provide for geographically-aware electronic traveling advertisements. Embodiments of the disclosure integrate geographical awareness into the field of electronic traveling advertisements, which may involve integrating a GPS unit into a digital advertisement banner. Using this GPS tracking unit, a log can be generated for the unit detailing which locations a particular advertisement was displayed at and for how long. Using embodiments of the disclosure, a business can charge more money for ads displayed in higher-density locations, for example. Advertisement display may also be triggered by proximity to a particular location for an extra fee.

FIG. 1 is a block diagram of a system 100 for providing geographically-aware traveling electronic advertisements ("ads") according to an embodiment of the disclosure. System 100 includes a mobile advertising unit 110 communicably coupled via network 120 to a central platform server 130. The network 120 may be a private network (e.g., a local area network (LAN), wide area network (WAN), intranet, etc.) or a public network (e.g., the Internet).

In one embodiment, mobile advertising unit 110 and central platform server 130 operate in conjunction to provide targeted electronic advertisements based on time and location of the mobile advertising unit 110. In some embodiments, central platform server 130 may be operated by an ad space broker, who facilitates the matching of advertisers looking to display ads with owners of the property having the mobile advertising units 110. The ad space broker may further own the mobile advertising units 110, and the property owners may either lease or outright purchase the mobile advertising units 110 for placement on their property. In addition, advertisers provide their ads to the ad space broker for display on the mobile advertising units for a fee. In turn, ad space broker displays the ads on the mobile advertising units 110 and the property owners receive a commission from the ad space broker for displaying the advertiser's ads.

Mobile advertising unit 110 may be a physical unit that is placed on a mobile property. In one embodiment, this mobile property is a vehicle, such as a car, truck, bus, company van, or taxicab. In other embodiments, the mobile property may be any kind of mobile transportation, such as bicycles, motorcycles, trains, airplanes, and so on. Embodiments of the disclosure integrate a GPS unit 111 in the mobile advertisement unit 110 to track a position of the mobile advertising unit on the mobile property at any point in time. In one embodiment, GPS unit 111 may include a separate satellite connection for location tracking purposes. Mobile advertising unit 110 can then display ads on its digital advertisement display 115 according to a location of the unit 110 determined from GPS unit 111, as well as a time of day determined from clock 112.

Ads to be displayed by mobile advertising unit 110 are received via network 116 from central platform server 130. Mobile advertising unit 110 includes a network device 116 allowing mobile advertising unit 110 to connect to network 120 in order to send and receive data, such as ads and log data. Ads received from central platform server 130 may be stored in memory 114 of mobile advertising unit 110.

Rules associated with the received ads may also be sent to the mobile advertising unit 110 from central platform server 130. Such rules will be described in more detail below, but may include whether the ad is a high priority ad or a general ad, a time preference for the ad, a location preference for the ad, and an expiration date/time for the ad. All of the ads received at the mobile advertising unit 110 may be run in a cycle. However, based on the received rules, ad selection module 113 of mobile advertising unit may interrupt the cycle to display high priority ads when certain location and/or time conditions are met. For instance, the ad selection module 113 periodically receives as input the location of the mobile advertising unit 110 from the GPS unit 111 and the current time from clock 112. If either of those inputs matches a rule condition for a high priority ad, then the currently-displayed ad is interrupted to show the high priority ad.

Ad selection module 113 may also generate a log that tracks each ad and the locations and times the particular ad was displayed. This log can be stored in memory 114 until a synchronization event occurs with the central platform server 130. In some embodiments, the synchronization event is occurs at predetermined time intervals, which may be once an hour or once a day, to name a few examples. During this synchronization event, the log is provided to the central platform server 130 for reporting purposes. In addition, any ads that have expired will also be removed from the mobile advertising unit 110. In some embodiments, if a mobile advertising unit 110 does not perform synchronization with the central platform server 130 in a certain time period, then the central platform server 130 acknowledges and reflects this for purposes of providing commissions to the property owner and providing any new ads to the mobile advertising unit 110.

Figure 2:
FIG. 2 is a block diagram of an embodiment of a log generated by mobile advertising unit.

FIG. 2 is a block diagram of an embodiment of a log 200 generated by mobile advertising unit 110. Log 200 may include a mobile advertising unit ID number 210 identifying the particular mobile advertising unit 110 creating the log 200. The log may further includes fields for the ID of the ad shown 220, GPS coordinates 230 where the ad was displayed, a start time 240 of the ad, and an end time of the ad 250. Log 200 will record an entry 260 each time an ad is displayed on the mobile advertising unit 110. In some cases, this may mean that a particular ad will have more than one entry 260 in the log 200.

Referring again to FIG. 1, in one embodiment, the mobile advertising unit 110 periodically performs diagnostic checks on the electronic ad displays 115 to make sure that the equipment is working properly. If any errors are encountered, the mobile advertising unit 110 sends error messages back to the central platform server 130. In some embodiments, the central platform server 130 may then send an automated message (e.g., an email or text message) out to the property owner to inform them of the problem with the display 115 on the mobile advertising unit 110. If the property owner of the mobile advertising unit 110 does not get the ad display 115 repaired within a certain number of days, then their commission earnings may be stopped until the equipment has been fixed.

In embodiments of the disclosure, the central platform server 130 is one or more server computing machines that administer and manage the services of the mobile advertising unit 110. The central platform server 130 includes multiple datastores. These datastores include a client datastore 131, an ad display property datastore 132, and a log datastore 133. Although depicting as located in a single server, these datastores 131-133 may be located together in a single database, or disparately located throughout several physically-separate databases.

Client datastore 131 holds data on the advertising clients that provide ads to be displayed on the mobile advertising unit 110. The client datastore 131 may include the contact information of each client as well as the ads of the client to be shown at the mobile advertising unit. It may also include information about whether each client is a high priority client or a general client, whether each particular ad is a high priority ad or a general ad, and an expiration date/time of each particular ad. In addition, if the ad is a high priority ad, the client datastore 131 will include information about time and location preferences for that ad. For instance, the client may pay a premium to make an ad high priority so that it will be shown near a particular location, such as a major sporting event, at a particular time, such as at the time of a major sporting even function. Other clients may want their ads to be shown during prime hours only or around particular locals, such as schools.

For purposes of making a client or an ad a high-priority one, the location and time-of-day and type of vehicle that the ad will be displayed varies in embodiments of the disclosure depending on who the advertising client is targeting. For example, if a client is marketing to sports fans, the ads may be displayed on the mobile advertising unit near major league stadiums, minor league stadiums, public playing fields, popular sports bars. There could also be a premium for display during major league game times near these locations. If a client is marketing to families, the ads may be displayed near supermarkets, schools, daycare facilities, movie theaters, and public parks. If a client is marketing to 9-5 commuters, the ads may be displayed on buses and taxis on the highway during rush hours.

Ad display property datastore 132 holds data on each of the mobile advertising units 110 and the property owners leasing or owning the mobile advertising units 110. Information stored in the datastore 132 would include the location type of the mobile advertising unit 110 (e.g., taxi, bus, truck, etc.) and the contact information of the property owner for the mobile advertising unit 110. In some embodiments, the datastore 132 may also include information on how valuable the advertising location of the property is based on where it is operating, the number of people exposed to the ads, etc.

Lastly, log datastore 133 is the central collection point for all of the data from the various mobile advertising units 110. For instance, the log datastore 133 holds data on which ads were run, at which locations, at which times, and for how long. As previously mentioned, each mobile advertising unit 110 keeps its own log that synchronizes to the log datastore 133 on a periodic basis.

In embodiments of the disclosure, ad management module 135 includes a script that relates the datastores 131-133 together in order to determine the advertisements that were run as well as when and where they were run. Then, ad management module 135 can create statements for billing purposes for the clients and commission reports for the property owners. In addition, processing logic can be accessed via web interface 134 to provide real-time impression/exposure reports based on the data found in datastores 131-133 to the clients and property owners. Such data can be invaluable to the clients and property owners in determining effectiveness of their ads and their mobile advertising units 110. Furthermore, ad property owners can also check the health of their displays and tweak settings from this web interface 134.

Figure 3:
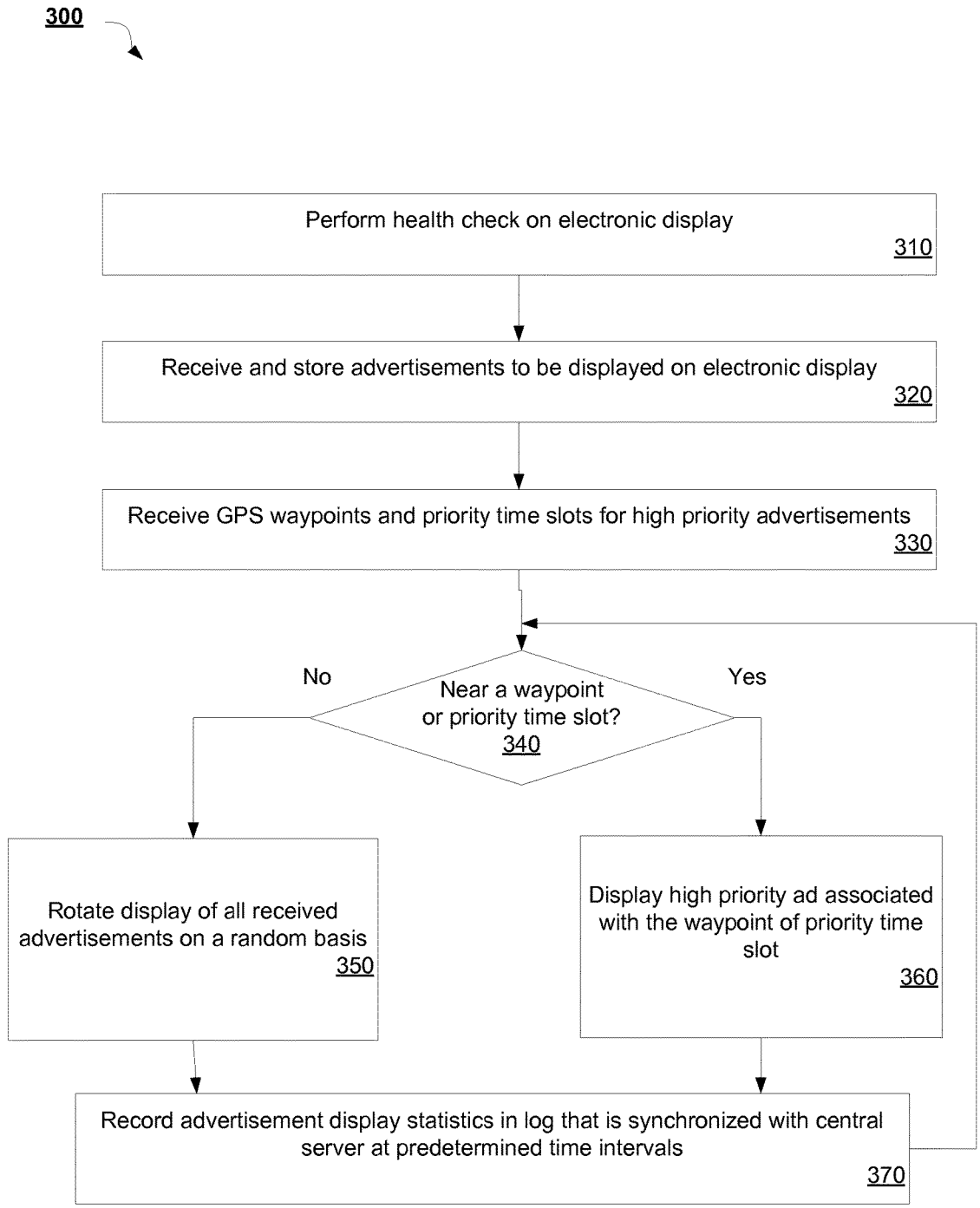
FIG. 3 is a flow diagram illustrating a method performed by a mobile advertising unit for geographically-aware electronic traveling advertisements according to an embodiment of the disclosure.

FIG. 3 is a flow diagram illustrating a method 300 performed by a mobile advertising unit for geographically-aware electronic traveling advertisements according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by mobile advertising unit 110 of FIG. 1.

Method 300 begins at block 310 where a self health check is performed on an electronic display of a mobile advertising unit. In some embodiments, if the health check reveals that the display is broken, then method 300 will inform a central server of this status and end immediately. Assuming that the health check passed, at block 320, the mobile advertising unit receives and stores advertisements to be displayed on an electronic display. In some embodiments, the advertiser will have previously communicated with an ad space broker that manages the distribution of the mobile advertising units to property owners and worked out a plan for showing ads of the advertiser, for instance on a high-priority basis or general basis according to the above description. At block 330, GPS waypoints and priority time slots are received for high-priority advertisements at the mobile advertising unit. At decision block 340, it is determined whether the mobile advertising unit is near any of the receiving GPS waypoint or has reached a priority time slot.

If not, then at block 350, the received advertisements are shown in a rotated fashion on a random basis. If the mobile advertising unit is near a received GPS waypoint or has reached a priority time slot, then the general ad rotation is interrupted to show the high-priority ads associated with the GPS waypoint or time slot at block 360. After an ad is shown (either general or high-priority), statistics related to the display of that ad are recorded in a log at the mobile advertising unit that is synchronized with a central server at predetermined time intervals at block 370. In some embodiments, this may be once an hour or once a day, to name a few examples. Method 300 then returns to decision block 340 to continue determining which received ads will be shown on its display.

FIG. 4 is a flow diagram illustrating a method 400 performed by a central platform server for geographically-aware electronic traveling advertisements according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by central platform server 130 of FIG. 1.

Method 400 begins at block 410 where advertisement logs from one or more mobile advertising units are received. In some embodiments, these advertisement logs record the advertisement ID, location, and time an advertisement was shown at the mobile advertising unit. The mobile advertising units include a GPS device and a clock that allows the mobile advertising units to determine where and when advertisements should be shown in accordance with the preferences of advertisers. At block 420, the central platform server correlates all received advertisement log data with data from a client datastore in order to create billing statements for one or more clients that are advertising on the mobile advertising units. The billing statements reflect where and when the client advertisements where actually displayed on the mobile advertising units.

At block 430, the central platform server correlates the received advertising log data with data from an advertisement display property datastore in order to create commission statements for one or more owners of the property having the mobile advertising units. The commission statements are based on where and when actual advertisements where shown on the mobile advertisements units. Lastly, at block 440, real-time impression/exposure reports are provided via a web interface to clients and property owners. These real-time impression/exposure reports are based on the data received from the advertising logs, as well as the datastores for the clients and property owners, and show where and when advertisements are displayed on the mobile advertising units.

Figure 5:
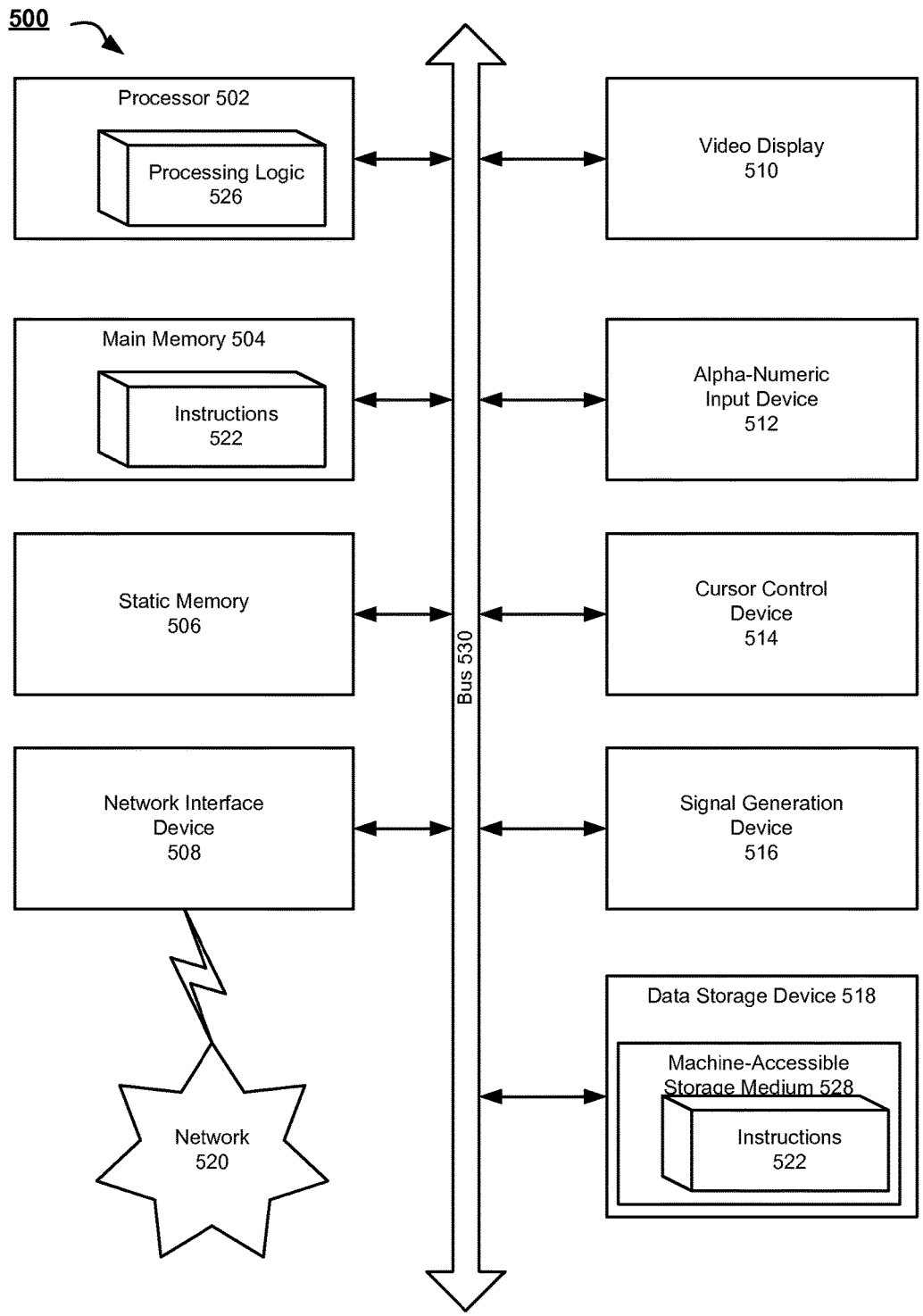
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to implement geographically aware electronic traveling advertisements by mobile advertising unit 110 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 300 and 400 for implementing geographically aware electronic traveling advertisements described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
providing, by a processing device of a mobile advertising unit, advertisements for display on an electronic display of the mobile advertising unit in a general rotation;
receiving, by the processing device, a priority advertisement and rules corresponding to the priority advertisement, wherein the rules comprise a range of geographic locations that trigger display of the priority advertisement and a time range to trigger display of the priority advertisement;
monitoring, by the processing device, a current geographic location of the mobile advertising unit from a location unit of the mobile advertising unit and a current time;
determining, by the processing device, that at least one of the monitored current geographic location is within the range of geographic locations of the rules for the priority advertisement or the monitored current time is within the time range of the rules for the priority advertisement; and
responsive to the determining:
stopping display of the general rotation on the display device; and
providing, by the processing device, the priority advertisement for display on the electronic display.

2. The method of claim 1, further comprising:
receiving the advertisements from a central server that administers service for the mobile advertising unit;
storing the advertisements in a data store of the mobile advertising unit; and
storing, in the data store, statistics for each advertisement displayed on the electronic display, the statistics stored in a log maintained in the data store.

3. The method of claim 2, further comprising synchronizing, at time intervals, the log to the central server, wherein the central server to utilize first data from the log and second data corresponding to advertising clients that is stored separately from the first data in the log to create a billing statement for one or more of the advertising clients in view of where and when the advertisements of the advertising clients were shown at the mobile advertising unit.

4. The method of claim 3, wherein the central server to utilize the first data from the log and third data corresponding to owners of property having mobile advertising units to create a commission statement for one or more of the property owners in view of where and when the advertisements were shown at the mobile advertising unit.

5. The method of claim 2, wherein the statistics comprise at least one of identification of each advertisement displayed, a geographic location of display of each advertisement, a time of display of each advertisement, or a duration of display of each advertisement.

6. The method of claim 2, further comprising deleting advertisements from the data store that have reached an expiration date.

7. The method of claim 1, wherein providing the priority advertisement for display further comprises interrupting the display of the advertisements on the electronic display.

8. The method of claim 1, further comprising performing a self-health check of the mobile advertising unit to determine whether the electronic display is functioning correctly.

9. The method of claim 8, wherein an owner of property having the mobile advertising unit is notified in response to a determination by the self-health check that the mobile advertising unit is not functioning correctly.

10. The method of claim 1, wherein the range of geographic locations comprises Geographic Positioning System (GPS) waypoints.

11. An apparatus comprising:
an electronic display device to display each of a plurality of advertisements;
a location unit; and
a processing device communicably coupled to the electronic display device and the location unit, the processing device to:
provide one of the plurality of advertisements for display on the electronic display device in a general rotation;
receive a priority advertisement and rules corresponding to the priority advertisement, wherein the rules comprise a range of geographic locations that trigger display of the priority advertisement and a time range to trigger display of the priority advertisement;
monitor a current geographic location of the mobile advertising unit from the location unit and a current time;
determine that at least one of the monitored current geographic location is within the range of geographic locations of the rules for the priority advertisement or the monitored current time is within the time range of the rules for the priority advertisement; and
responsive to the determining:
stop display of the general rotation on the display device; and
provide the priority advertisement for display on the electronic display device.

12. The apparatus of claim 11, further comprising a data store communicably coupled to the processing device, wherein the processing device is further to:
receive the plurality of advertisements from a central server that administers service for the mobile advertising unit, wherein the received plurality of advertisements are stored in the data stores; and
receive geographic locations and time slots for the priority advertisement.

13. The apparatus of claim 12, wherein the processing device is further to store statistics for each advertisement displayed on the electronic display device in a log maintained in the data store, and wherein the central server utilizes first data from the log and second data about advertising clients that is stored separately from the first data in the log to create a billing statement for one or more of the advertising clients in view of where and when the advertisements of the advertising clients were shown at the apparatus.

14. The apparatus of claim 13, wherein the central server to utilize the first data from the log and third data about owners of property having mobile advertising units to create a commission statement for one or more of the property owners in view of where and when the advertisements were shown at the apparatus.

15. The apparatus of claim 11, wherein the range of geographic locations comprises Geographic Positioning System (GPS) waypoints.

16. A non-transitory machine-readable storage medium including instructions that, when accessed by a processing device, cause the processing device to:
provide, by the processing device of a mobile advertising unit, advertisements for display on an electronic display of the mobile advertising unit in a general rotation;

receive, by the processing device, a priority advertisement and rules corresponding to the priority advertisement, wherein the rules comprise a range of geographic locations that trigger display of the priority advertisement and a time range to trigger display of the priority advertisement;

monitor, by the processing device, a current geographic location of the mobile advertising unit from a location unit of the mobile advertising unit and a current time;

determine, by the processing device, that at least one of the monitored current geographic location is within the range of geographic locations of the rules for the priority advertisement or the monitored current time is within the time range of the rules for the priority advertisement; and responsive to the determining:
   stop display of the general rotation on the display device; and
   provide, by the processing device, the priority advertisement for display on the electronic display.

17. The non-transitory machine-readable storage medium of claim 16, wherein the processing device is further to:
receive the advertisements from a central server hat administers service for the mobile advertising unit; and
receive geographic locations and time slots for the priority advertisement.

18. The non-transitory machine-readable storage medium of claim 17, wherein the central server is to:
store, by the processing device in the data store, statistics for each advertisement displayed on the electronic display in a log maintained in a data store of the mobile advertising unit;
utilize first data from the log and second data about advertising clients that is stored separately from the first data in the log to create a billing statement for one or more of the advertising clients in view of where and when the advertisements of the advertising clients were shown at the mobile advertising unit; and
utilize the first data from the log and third data about owners of property having mobile advertising units to create a commission statement for one or more of the property owners in view of where and when the advertisements were shown at the mobile advertising unit.

19. The non-transitory machine-readable storage medium of claim 16, wherein the processing device is further to perform a self-health check of the mobile advertising unit to determine whether the electronic display is functioning correctly.

20. The non-transitory machine-readable storage medium of claim 16, wherein the range of geographic locations comprises Geographic Positioning System (GPS) waypoints.

* * * * *